United States Patent [19]

Bouchard

[11] Patent Number: 5,732,466
[45] Date of Patent: Mar. 31, 1998

[54] MANUFACTURER OF BRUSH SEALS

[75] Inventor: Joseph Paul Bouchard, Kennebunkport, Me.

[73] Assignee: United Technologies Corporation, Hartford, Conn.

[21] Appl. No.: 342,490

[22] Filed: Nov. 21, 1994

[51] Int. Cl.[6] ............................................. B23P 15/00
[52] U.S. Cl. ........................... 29/888.3; 451/916; 83/13
[58] Field of Search .......................... 29/888.3; 451/916, 451/61, 27; 300/21; 83/13, 55; 277/53

[56] References Cited

U.S. PATENT DOCUMENTS

| | | | |
|---|---|---|---|
| 4,274,575 | 6/1981 | Flower | 228/160 |
| 4,642,867 | 1/1987 | Hough et al. | 29/423 |
| 4,678,113 | 7/1987 | Bridges et al. | 228/160 |
| 4,839,997 | 6/1989 | Pritchard | 451/916 |
| 5,110,033 | 5/1992 | Noone et al. | 29/888.3 |
| 5,165,758 | 11/1992 | Howe | 300/21 |
| 5,183,197 | 2/1993 | Howe | 228/160 |

*Primary Examiner*—Larry I. Schwartz
*Assistant Examiner*—Marc W. Butler
*Attorney, Agent, or Firm*—Edward L. Kochey, Jr.

[57] ABSTRACT

Excess length 20 of brush seal wires 14 is sheared off with a punch 30 and die 26. A true and accurate diameter 22 is formed. The wires can be ground to a final finish diameter 18 if desired.

13 Claims, 1 Drawing Sheet

MANUFACTURER OF BRUSH SEALS

TECHNICAL FIELD

The invention relates to brush seals with metallic wire bristles and in particular to final forming of the wire bristle lengths.

BACKGROUND OF THE INVENTION

Brush seals are often used to seal between moving adjacent parts. A support member carries multiple wires which are substantially parallel to each other and which extend outwardly from the support. In operation of the seal wires bear against the adjacent moving part effecting an air seal.

With an annular support member the wires may extend inwardly or outwardly for the brush seal. Often these will extend at an angle with the circumference of the support, although sometimes they radially extend.

Various methods are known to initially assemble the wire bristles on the support ring. There is the bundle and place method wherein wire tufts are formed and secured to the ring by welding, clamping or some other method. There is the winding method where wire is wound around a mandrel and either removed from the mandrel to a support ring or the mandrel itself used as a support ring for the brush seal.

In either case the wires cannot be placed sufficiently accurately for the ends of the wire to be in their desired final location. Accordingly a rough assembly is first made and it is finished to size by grinding. Because of the resiliently flexible nature of the wires the grinding is a slow process. Electrodischarge machining is sometimes used for further roughing out the brush seal size followed by grinding, in order to reduce the time.

SUMMARY OF THE INVENTION

A plurality of substantially parallel wires forming the brush seal are circumferentially placed, and secured to an annular support member. These may extend inwardly or outwardly from the support member. The excess wire length is sheared with a circular punch and die, forming an accurate and true diameter of the wire ends. Where additional precision is required they may be thereafter ground to a precise diameter.

DESCRIPTION OF THE PREFERRED EMBODIMENT

Wire bristles of brush seals are notoriously delicate. These brush seals therefore must be handled with tender care. Those skilled in manufacturing operations rejected any suggestion of punching to size the brush seal, because it was believed that such rough handling of the brush seals would destroy them.

There was also concern amongst those skilled in the art because their experience had dictated that shearing of the brush seals would require excessive force by the punching machine. For instance, the seal in question is formed of 302,000 wires of 0.07 millimeters diameter. These are secured by welding to a ring of 52 centimeters outside diameter. At the desired shear circle the cross-sectional area of the wires totaled 17.8 centimeters$^2$. Standard evaluation showed that a force of 1,440,000 newtons was required to shear such a seal.

Shearing however accomplished on a punch having a capacity of 890,000 newtons, with no difficulty or evident strain. It is not known why the force is so much less than expected, but it is observed that the wires sheared sequentially through the thickness of the brush seal, even though a square end punch with no shear angle is used. Furthermore there may be some relationship between the initial shearing of a particular wire and the fracture of the remaining portion which results in this surprisingly low force requirement.

Figure 1:
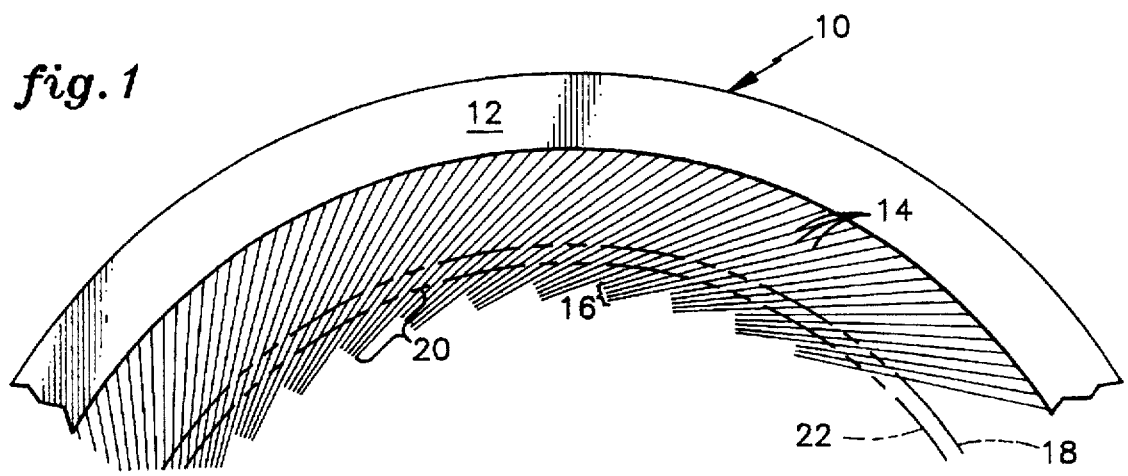
FIG. 1 is a partial plan view of a brush seal.

Referring to FIG. 1 a brush seal 10 has a support ring 12 to which a plurality of wires 14 are welded to form the brush seal. These wires are preferably formed in a plurality of tufts 16 with each tuft being secured to the support ring 12. As shown here the wires extend inwardly from the support member at an angle with respect to the circumference of the ring of about 45°.

The dashed arc 18 shows the final desired inside diameter to be formed by the brush seal. In order to achieve this diameter the excess extending wire length 20 is sheared with a circular punch and die resulting in an accurate and true sheared diameter 22.

In some cases this may be adequate for the final diameter without additional grinding. However where more precision is required the wires may be ground to the final diameter 18.

Figure 2:
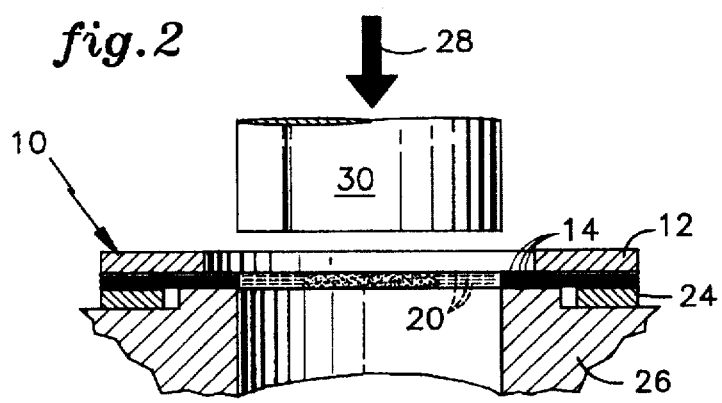
FIG. 2 is an elevation of a punching operation.

FIG. 2 shows the brush seal 10 with the wires 14 welded to support member 12 and to auxiliary support member 24. The brush seal is placed on die 26 and force 28 is applied to punch 30. The excess wire 16 is removed by punching. Good dimensional control is possible, and there is no recast layer at the end of the wires as there is with EDM.

Figure 3:
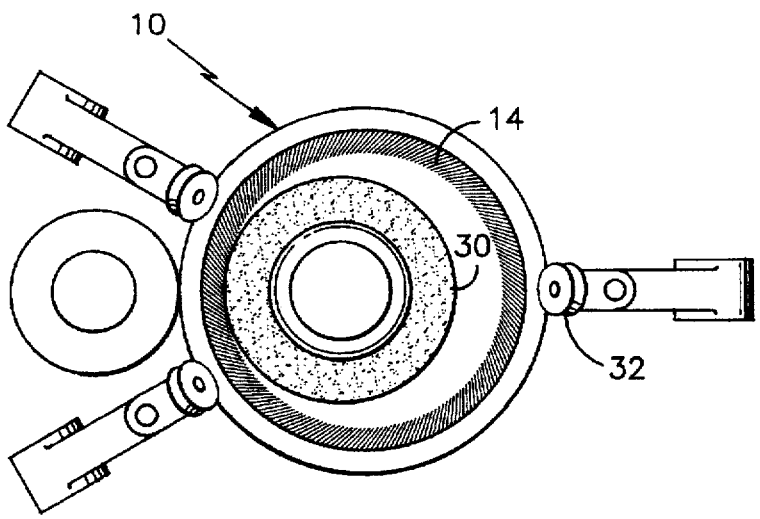
FIG. 3 is a sketch of the finished grinding operation.

Thereafter the wires may be finished to final size and smoothness as illustrated in FIG. 3 where grinding occurs with grinding wheel 30. Rolls 32 support and rotate the seal 10 so that the wires 14 may be ground to the desired length as illustrated by arc 18 of FIG. 1.

Referring again to the particular seal described earlier full grinding away of all the excess material would take 17 hours. This is reduced to a overall time of 1.7 hours by using a combination of electrodischarge machining and grinding. The electrodischarge machine takes 3 hours, and the finish grinding takes 1.7 hours.

With the punching operation described here the entire cycle time of the operation takes only one minute. Additional grinding, if required, would add 1.7 hours.

I claim:

1. A method of manufacturing a brush seal, comprising:

circumferentially placing and securing to an annular support member a plurality of substantially parallel wires extending beyond one radial edge of said support member; and shearing excess extending wire length with a circular punch and die, whereby an accurate and true diameter of the wire ends is formed.

2. The method of claim 1 including:

remaining extending wire length existing when said excess extending wire length is shared;

thereafter grinding said remaining extending wire length to a precise diameter.

3. The method of claim 1, further comprising:

forming said plurality of wires into a plurality of tuffs before securing said plurality of wires to said support member.

4. The method of claim 1, wherein:

said wires are secured extending radially inward from said support member.

5. The method of claim 1, wherein:

said wires extend at an angle to the circumference of said annular support member.

6. The method of claim 2, further comprising:

forming said plurality of wires into a plurality of tufts before securing said plurality of wires to said support member.

7. The method of claim 2, wherein:

said wires are secured extending radially inward from said support member.

8. The method of claim 2, wherein:

said wires extend at an angle to the circumference of said annular support member.

9. The method of claim 3, wherein:

said wires are secured extending radially inward from said support member.

10. The method of claim 3, wherein:

said wires extend at an angle to the circumference of said annular support member.

11. The method of claim 6, wherein:

said plurality of wires are secured extending radially inward from said support member.

12. The method of claim 6, wherein:

said wires extend at an angle to the circumference of said annular support member.

13. The method of claim 11, wherein:

said plurality of wires extend at an angle to the circumference of said annular support member.

* * * * *